Nov. 17, 1936.  A. H. LLOYD  2,061,081
MOTOR VEHICLE BRAKE MECHANISM
Filed Feb. 2, 1934  2 Sheets-Sheet 1
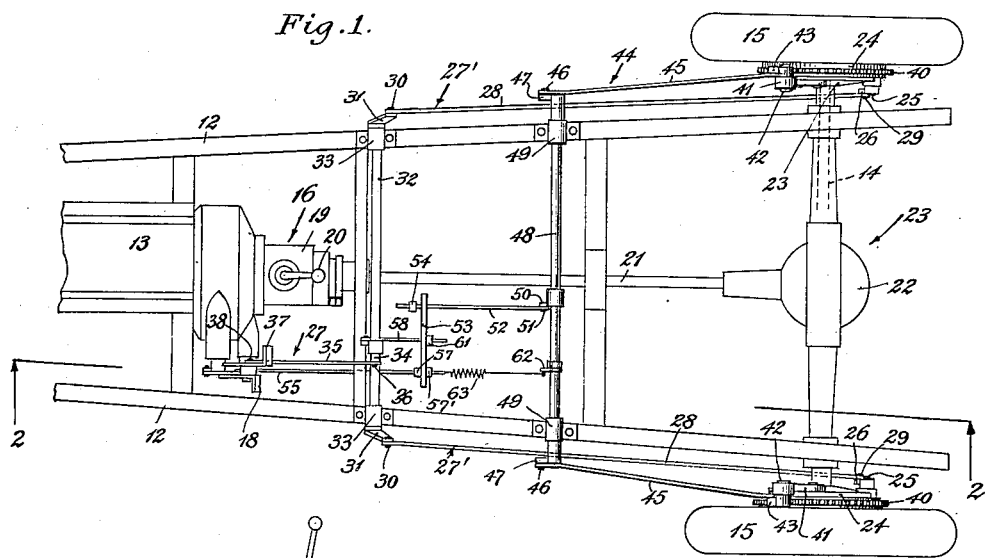
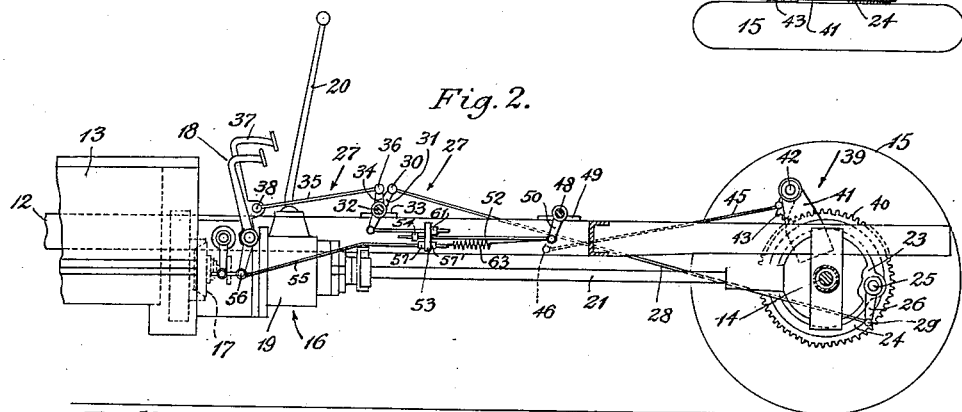
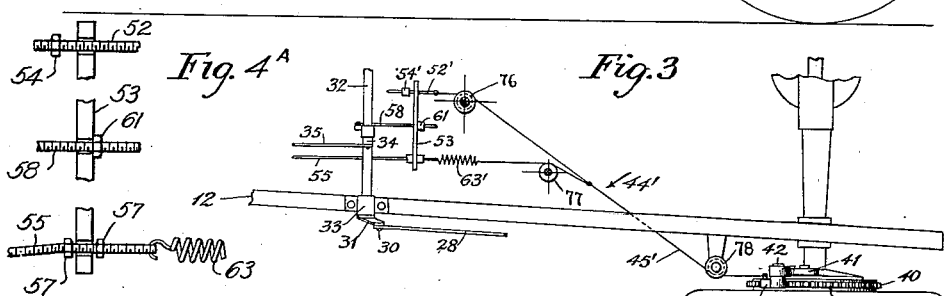
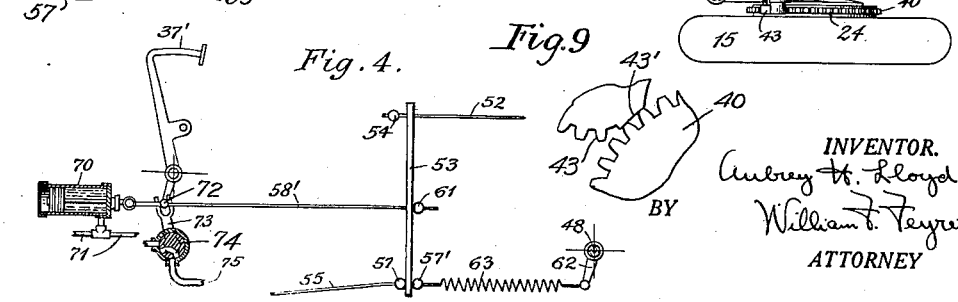
INVENTOR.
Aubrey H. Lloyd
BY William F. Teyrer
ATTORNEY Nov. 17, 1936.  A. H. LLOYD  2,061,081
MOTOR VEHICLE BRAKE MECHANISM
Filed Feb. 2, 1934  2 Sheets-Sheet 2
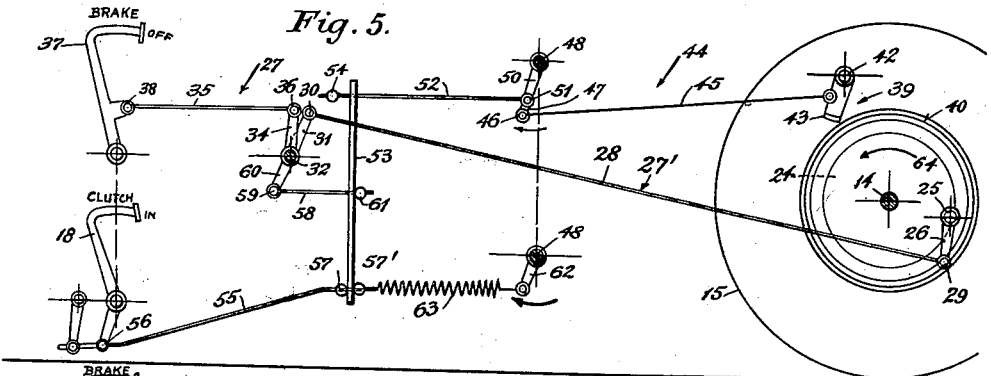
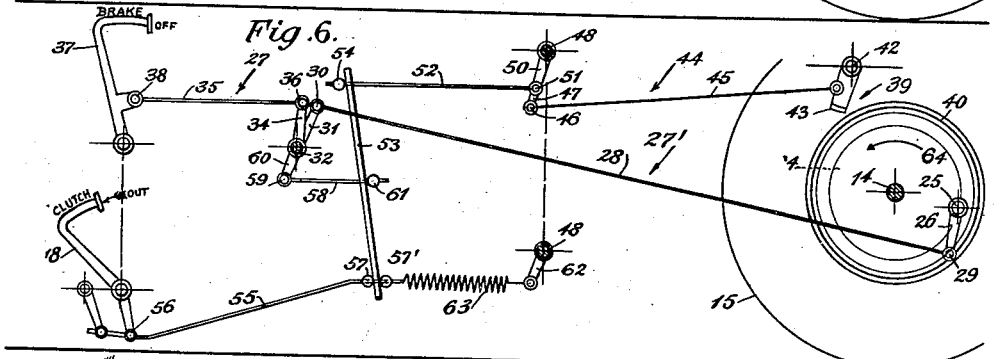
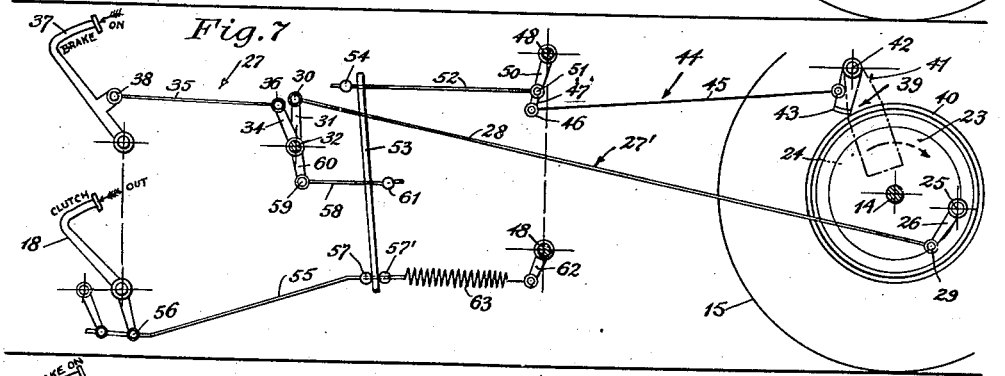
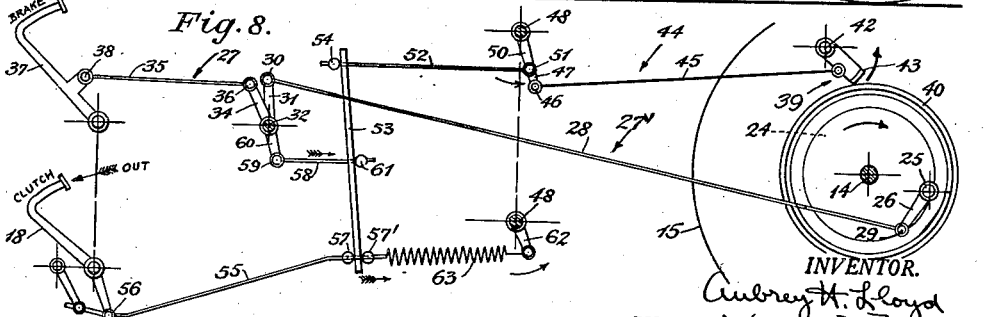
INVENTOR.
Aubrey H. Lloyd
BY William J. Feyrer
ATTORNEY Patented Nov. 17, 1936

2,061,081

UNITED STATES PATENT OFFICE 2,061,081

MOTOR VEHICLE BRAKE MECHANISM

Aubrey H. Lloyd, Norwalk, Conn.

Application February 2, 1934, Serial No. 709,457

18 Claims. (Cl. 192—13)

This invention relates primarily to novel improvements in motor vehicle braking mechanisms.

It has as a principal object the provision of means adapted to prevent a motor vehicle or the like from inadvertently and sometimes disastrously rolling backward down a hill when stopped for traffic.

Another object of the present invention is the provision of means to facilitate the operation of starting a motor vehicle forwardly again after stopping it upon an incline.

It is a further object of the present invention to provide mechanism of the character just described which will be of simple design, economical to manufacture, and positive in its action.

A feature of the present invention is the provision of mechanism adapted to automatically operate the usual manually controlled braking system in a motor vehicle automatically when a clutch is in pre-determined condition and upon rearward rolling of the motor vehicle.

Another feature of the present invention is the provision of mechanism adapted to automatically operate the usual manual braking system, which, however, remains normally inoperative during regular manipulation of the manual control of the braking system and regular manipulation of the clutch.

And yet another feature of the present invention is the provision of an automatic braking mechanism adapted to prevent inadvertent rearward rolling of the motor vehicle, which is equally applicable for use with the so-called mechanical, hydraulic or air type brakes.

Other features and advantages will appear hereinafter.

In the drawings:

Figure 1 is a top plan view of the main-frame and some of the main operating parts of a motor vehicle, and shows the present invention applied thereto.

Fig. 2 is a sectional view taken on line 2—2 in Fig. 1.

Fig. 3 is a fragmentary view of a modified form of the present invention.

Fig. 4 is a detail showing the present invention applied to hydraulic and air braking systems.

Fig. 4A is a fragmentary sectional view of the take-up plate and associated parts shown in Figs. 1 and 4.

Fig. 5 is a diagrammatic view of the present preferred embodiment of the invention in normal position, as when the motor is driven forward or rearward under power.

Fig. 6 is a view similar to Fig. 5, but shows the parts in the positions they occupy when the car is coasting forward.

Fig. 7 is a view similar to Fig. 6, but in addition shows the brake applied.

Fig. 8 is a view similar to Fig. 7, but shows the automatic control of the present invention in operative position, as when a car rolls backward.

Fig. 9 is a fragmentary view of the segment and main gear.

In the past there have been numerous efforts to provide mechanism to prevent a vehicle from rolling backward, when stopped on an incline, but nearly all of these efforts have been something in the nature of a ratchet wheel on the propeller shaft, axle or rear wheel with a co-operating pawl arranged to take the full load of the rearward rolling vehicle. The load imposed was so heavy in most of these arrangements that the pawl was sheared from its pivot, or the ratchet teeth were sheared. The present invention provides a novel mechanism eliminating such disadvantages through the provision of mechanism adapted to utilize regular braking mechanism in a vehicle for increased safety and driving ease.

Referring now in detail to the drawings and particularly to Figs. 1, 2, and 5 through 8 which disclose the present preferred embodiment of the invention, there is shown a motor vehicle frame 12 supporting a prime mover 13, for example though not necessarily, a gas engine at its forward end, and with an axle 14 supporting wheels 15 which in the present showing form the driving wheels for the vehicle.

A transmission system 16 is also shown which in the present disclosure includes a clutch 17 and associated clutch pedal 18 adapted to connect the prime mover 13 with a transmission gear box 19, the latter being capable of various speeds by variable positioning of the transmission control lever 20 and in turn transmitting rotation and power through a propeller shaft 21 to a differential 22 in the rear axle housing 23 and from the differential to the driving wheels 15.

An illustrative, manually controlled brake system 27 is included in the present drawings; the wheels 15 are each provided with a drum 24 enclosing any usual form of internal friction brake including a brake spreader stud 25 having a downwardly extending finger 26. A suitable brake system linkage 27' is provided to manually control the brakes. In the present showing this linkage comprises rods 28 each having a pivot connection 29 to the finger 26. These rods extend forwardly from the pivots to pivot connections 30 on fingers 31 at the outer ends of a brake bar 32 which is transversely and rotatably supported in suitable bearings 33 on the upper side of the main frame. The brake linkage also includes a single, intermediate, upwardly projecting finger 34 secured to the brake bar 32 and a link 35 extending from a pivot 36 on the arm forwardly to a manually operable brake control 37 to which it is connected with a pin 38.

When the brake control 37 is moved forwardly the link 35 is pulled forwardly (see Fig. 7), and it in turn imparts a counterclockwise rotation to the arm 31 through the brake bar 32, and the latter in turn imparts a forward pull to the long rods 28 and to the fingers 26 which through the spreader studs 25 spread the brakes within the drums 24 to hold the car against rolling.

The mechanisms so far described are of the conventional type found in most motor vehicles of present day manufacture. They are merely illustrative of one application of the present invention and are in no way intended to limit the real invention, which is still to be described, for the invention is equally applicable in vehicles wherein electricity, steam and other motors are used as prime movers, and wherein hydraulic clutches and other general forms of transmission apparatus are used, as will be apparent from the proceeding disclosure. Also, the present invention is equally applicable with air or hydraulic type brakes, and is so illustrated and described herein.

Coming now to the particularly important structure provided by the present invention, it should be particularly noted that the present invention provides connectors 39 which in their present preferred form comprise external gears 40 on and rotatable with the brake drums 24, together with arms 41 on the rear axle housing 23 provided with pivots 42 rotatably supporting gear segments 43, which, as will be pointed out hereinafter, are adapted to move into engagement with the gears 40 and to be driven by the latter through a predetermined, arcuate path.

In this, the present preferred form of the invention, an automatic control linkage 44 is provided to associate the connectors 39 with the braking system 27. It comprises links 45 extending forwardly from the connectors 39 to a pivot 46 on the lower end of downwardly extending arms 47 on a rod interponent 48 which is rotatably supported in suitable bearings 49 on the main frame 12. Secured to the interponent 48 is a downwardly extending arm 50 provided with a pivot 51 at its lower end for connection to what is preferably called an interponent slide link 52, while the latter is passed through a suitable aperture in a take-up plate 53 and is preferably threaded at its forward end to support an adjusting nut 54. At the opposite end the take-up plate is provided with a hole adapted to accommodate a threaded tip on a control rod 55 extending from a pivot 56 at the lower end of the clutch pedal 18. Preferably two nuts 57 and 57' are provided near the outer end of this control rod in order to locate the take-up plate 53 properly with respect to the rod. These nuts are preferably spaced just wide enough apart to allow the plate to move arcuately slightly relative thereto, but prevent sliding movement of the plate lengthwise relative to the rod.

Intermediate the rod 55 and the interponent slide rod 52 there is provided a suitable aperture in the take-up plate which accommodates what is preferably termed a brake sliding link 58. This link has a pivotal connection on a stud 59 at the lower end of a downwardly projecting arm 60 which is preferably locked on the brake bar 32 and is at its other end provided with an adjustable nut 61. A secondary finger 62 on the interponent 48 provides a connection for a coil spring 63 and the latter in turn is connected at its forward end with the control rod 55 preferably in order to rotate the interponent and thereby pull the inter-connected links 45 and 52 and the associated gear segments 43 free of the gears 40 on the brake drums 24 when the clutch pedal 18 (as shown in Fig. 5) is in the back position. This spring does not serve to maintain the clutch in the back position. It may be dispensed with entirely and the parts so adjusted that the lower end of the back wall of the gear segment 43 just lies atop the gear teeth 40 while the wheels 15 are rotating in the direction of the arrows 64 shown in Figs. 5 and 6, and move mainly by gravity into the gear teeth when the automatic control linkage 44 is properly prepared.

The plate 53 may be supported by a coil spring or any other well known means from the underside of a floor board of the automobile, which is not shown, in order to make the present diagrammatic showing as simple and clear as possible. However, no such spring is really required as the rod 55 and spring 63 connected to the clutch lever and to finger 62 form a good support, while the spring 63 and nut 57, or any tendency of the take-up plate 53 to drop at its inner end, serves to move the plate 53 in a counterclockwise direction as viewed in Fig. 5 about the nut 61 until the plate engages the nut 54.

Operation of this form of the invention is as follows: The operator may step into the vehicle, start the prime mover 13 and then operate the transmission 16 and clutch pedal 18 in the usual manner, as long as there is no tendency for the car to roll backward, and during this process the automatic control linkage 44 of the present invention does not automatically apply the brakes. When the clutch pedal 18 is in the back position and the motor vehicle is being driven forwardly in the normal manner the brake linkage 27' and automatic control linkage 44 are in the positions shown in Fig. 5.

As the car rolls down a hill or goes into traffic the operator may step on the clutch pedal 18 and push it in or forward and still have the car roll forwardly without danger of having the automatic control of the present invention function to operate the brakes. The positioning of the various parts during such operation and movement of the vehicle are as shown in Fig. 6. As the clutch pedal 18 is pressed down the control rod 55 is pushed back, the nut 57 imparts a counter clockwise movement to the take-up plate 53 pivotally about the brake slide rod 58, while the other end thereof moves freely along the interponent slide rod 52 to take up the space (see Fig. 5) between the plate 53 and the nut 54 to just about engage the nut without substantially moving the interponent 48 in any way, as shown in Fig. 6. Although the tension on the spring 63 is relieved as the clutch is moved out, the inside end of the plate 53 engages with the adjustment nut 54 on the interponent slide rod 52 and prevents the gear segments 43 from falling into engagement with the gears 40, thereby also permitting normal gear shifting through the transmission control lever 20 and permitting rearward movement of the motor vehicle through the transmission without danger of automatically applying the brakes with the present invention.

When a stop is made on a hill, though, the present invention is put to real use. As is customary at such a point in the operation of a vehicle, both the clutch pedal 18 and brake control 37 are pushed forward, as may be seen in Fig. 7, whereupon, according to the present invention, the control rod 55 moves the take-up plate 53 toward the rear of the car a predetermined extent, and the brake slide rod 58 moves, with the adjusting nut 61 thereon, rearwardly with respect to the plate so that the inside end of the plate 53 no longer holds the nut 54 in the forward position, but allows the automatic control links 45 and 52 to move rearwardly enough so that the associated gear segments 43 move to engagement with the gears 40.

Thus, if there is any rearward rolling of the motor vehicle or any rearward rotation of the driving wheels 15 the gears 40 move the gear segments 43 toward the rear of the vehicle, as may be clearly seen in Fig. 8, whereupon the segments through the rods 45 and to the other associated parts of the automatic control linkage 44 pull the arms 47 rearwardly while the interponent 48 through the slide link 52 pulls the take-up plate 53 rearwardly sufficiently to engage the nut 61 on the brake slide rod and rotates the arm 60 and associated equalizer bar 32 so that the upwardly projecting fingers 31 are moved toward the front of the vehicle and tighten the brakes through the rods 28.

These last described mechanisms and conditionings are such that the operator may let up on the brake control fully and still have the automatic control linkage 44 hold the vehicle against rearward rolling, thereby permitting absolutely free and unhurried use of that foot for the foot gas accelerator or some other instrumentality in the vehicle. As the clutch pedal 18 is allowed to come back to the normal position and the wheels 15 move forwardly again in the direction of the arrows 64 in Figs. 5 and 6, the gears 40 automatically move the gear segments 43 forwardly again into their normally inoperative position, whereupon the entire brake linkage 27 and automatic control linkage 44 are again in the inoperative position shown in Fig. 5.

The adjustment of the connectors 39 may be such that the brakes are fully applied while the teeth of the gear segments 43 are still in engagement with the gears 40, or may be so adjusted that the teeth on the segments are all the way back and in effect rest upon top of the gear teeth, in which event the sides of the segment teeth would be preferably slightly rounded as at 43' to blend with the radius and ride quietly at the top of at least two of the main gear teeth, as shown in Fig. 9, instead of presenting a sharp edge thereto which would alternately ride the tops and gaps of individual teeth.

Although the automatic braking system just described is shown as applied to driving wheels, this is not necessarily so, since it may still be used on the rear wheels of the car in the manner shown, even though the prime mover drives the vehicle through the front wheels. Although connectors 39 are shown on two of the wheels, it is within the purview of this invention to apply connectors to one or more of the wheels on a vehicle, the single control form being shown in Fig. 3 and multiple control being shown in Fig. 1 particularly.

In Fig. 3 there is shown a modified form of the present invention. Since the frame, prime mover, transmission, wheels and braking system (usual vehicle parts) and the connector 39, take-up plate 53, brake slide link 58 and clutch control of special construction are essentially the same as those already described in detail, only a fragmentary showing of the vehicle is included. The main point of difference between this modified form and the preferred form of the present invention already described in detail is that the indirect automatic control linkage 44 is dispensed with and a direct linkage 44' is provided between connector 39 and take-up plate 53. Preferably this direct connection comprises a rod 45' extending at a slight angle forwardly to the inside end of the take-up plate 53, where it is also provided with an adjustment nut 54' slightly in advance of the take-up plate normally, and the rear end of a spring 63' is hooked into a notch in the rod. Thus, the plurality of links 45 and 52, fingers 47, 50 and 62, and costly interponent 48 may be dispensed with and are replaced with a simple, one-piece, direct connection. This form of the invention functions in exactly the same manner as the form already described in detail.

As shown, this last described form of the invention (Fig. 3) is provided with suitably mounted rollers 76, 77, and 78 adapted to effect a straight pull on the take-up plate 53 and on the segment 43; however, their use is not absolutely essential.

Fig. 4 shows the present invention arranged to control hydraulic and air brakes rather than mechanical brakes. The arrangement is such that the take-up plate 53 pulls back a brake slide rod 58' which is connected to a usual form of hydraulic chamber 70, the latter through a line 71 hydraulically actuating the brakes. A pivot 72 on the lower end of the brake control 37' also arcuately moves a valve lever 73 to open and close an air valve 74 which through pipes 75 controls air brakes on a truck trailer, while the hydraulic controls operate the regular truck brakes, for example.

This form of the invention is associated with like connectors 39 and take-up plate 53 as the two previously described forms of the invention, and functions in the same manner.

After the brakes are automatically operated to prevent the car from rolling backwards on a hill they serve to hold a car on the incline without pulling up the emergency brake, even though the operator's foot has been moved from the brake control. Thus the safety device of the present invention not only prevents dangerous rearward rolling of a vehicle while it is on an incline, but it also assists the operator in again starting the car forwardly from a stopped position on an incline.

Variations and modifications may be made within the scope of the invention, and portions of the improvements may be used without others.

I claim:

1. In a motor vehicle, the combination of a pair of driving wheels; a prime mover; brakes for said driving wheels; a manually operable mechanism for controlling said brakes; a transmission mechanism; a clutch pedal in said transmission mechanism adapted to connect said prime mover to the driving wheels for forward and reverse rotation of the latter, having operative and inoperative stations; and means adapted to automatically operate said braking mechanism and thereby prevent the motor vehicle from rolling backward when the clutch pedal is in the inoperative station.

2. In a motor vehicle, the combination of a pair of driving wheels, brakes for said driving wheels; manually operable mechanism for controlling said brakes; a prime mover; a transmission mechanism; a clutch pedal in said transmission mechanism for connecting said prime mover to said driving wheels, and having operative and inoperative positions; and means associated with said driving wheels adapted to automatically operate said manually operable braking mechanism and thereby cause said brakes to frictionally hold the wheels against turning whenever said clutch pedal is in the inoperative position and when the car begins to roll backward.

3. In a motor vehicle vehicle, the combination of a pair of driving wheels; a prime mover; a transmission mechanism; a clutch pedal for connecting and disconnecting said prime mover to said driving wheels; brakes on said driving wheels; mechanism for controlling said brakes; a lever for manually operating said braking mechanism; and means, including gears on the driving wheels and segments adjacent thereto, the latter having a link connection with the brake lever and being adapted to move into the gears on the driving wheel to automatically operate the braking system when said clutch pedal is in the disconnecting position, upon rearward rotation of the driving wheels.

4. In a motor vehicle, the combination of a main frame; a pair of driving wheels; brakes for said driving wheels; manually operable mechanism for controlling said brakes; a prime mover; a transmission mechanism; a clutch pedal in said transmission mechanism for connecting and disconnecting said prime mover to said driving wheels; a rod interponent transversely and rotatably supported by said main frame; gears on said driving wheels; gear segments pivotally mounted adjacent said gears and movable into engagement with the gears on the driving wheels; linkage connecting said gear segments to the interponent; and means, associated with said interponent, manually operable braking mechanism and with said clutch pedal adapted to permit said segments to move into engagement with the gears and to automatically operate the brakes when said clutch pedal is in position for disconnecting said prime mover.

5. In a motor vehicle, the combination of a chassis; driving wheels on said chassis; a transmission; brakes on the driving wheels; a brake bar on said chassis; linkage connecting said brake bar to said brakes; a brake lever; a link connecting said brake lever to said brake bar; an arm on said bar; a take-up plate associated with said arm; a clutch pedal associated with said take-up plate; and means associated with said driving wheels adapted to control said take-up plate, and thereby cause the plate to automatically move the interconnected brake into operative car holding position upon rearward rotation of the driving wheels when the clutch pedal is in a predetermined position.

6. In a motor vehicle, the combination of wheels; a prime mover; braking mechanism for said wheels; a manually operable mechanism for controlling said brakes; a transmission system; a clutch pedal adapted to connect said prime mover to the wheels for forward and reverse rotation of the latter and having operative and inoperative positions; and gravity means adapted to automatically operate said braking mechanism and thereby prevent the motor vehicle from rolling backward when the clutch pedal is in the inoperative station.

7. In a motor vehicle, the combination of a pair of wheels; a prime mover; a transmission mechanism; a clutch pedal for connecting and disconnecting said prime mover for driving the vehicle; brakes on some of said wheels; manually operable mechanism for operating said brakes; a pedal for manually operating said braking mechanism; and means, including gears on the wheels and segments adjacent thereto, the latter having link connections with the brake pedal and being adapted to move by gravity into the gears on the wheels, to automatically operate the braking mechanism when said clutch pedal is in the disconnecting position, upon rearward rotation of the wheels.

8. In a motor vehicle, the combination of a chassis; a pair of driving wheels; brakes for said driving wheels; manually operable mechanism for controlling said brakes; a prime mover; a transmission system; a clutch pedal in said system for connecting and disconnecting said prime mover to said driving wheels; a rod interponent transversely and rotatably supported by said chassis; gears on said driving wheels; gear segments pivotally mounted adjacent said gears adapted to drop by gravity into engagement with the gears on the driving wheels; linkage connecting said gear segments to the interponent; and means associated with said interponent, manually operable braking mechanism and with said clutch pedal adapted to permit said segments to drop by gravity into engagement with the gears and to automatically operate the brakes when said clutch pedal is in position for disconnecting said prime mover.

9. In a motor vehicle, the combination of a chassis; driving wheels on said chassis; brakes on said driving wheels; a brake bar on said chassis; links connecting said brake bar to said brakes; a brake lever; a link connecting said brake lever to said brake bar; an arm on said bar; a take-up plate associated with said arm; and means associated with said driving wheels and controlling said take-up plate, and effecting movement thereof and thereby causing it to automatically move the interconnected brake into operative work holding position upon rearward rotation of the motor vehicle wheels.

10. In a motor vehicle, the combination of a pair of driving wheels; fluid controlled braking mechanism associated with said driving wheels; a prime mover for said wheels; a fluid valve for manually controlling said brakes; a clutch mechanism adapted to connect said driving wheels to the prime mover for forward and reverse rotation, and having operative and inoperative positions; and means operated by the driving wheels adapted to automatically control said fluid valve and thereby operate the braking mechanism and prevent the motor vehicle from rolling backward when the clutch mechanism is in the inoperative state.

11. In a motor vehicle, the combination of a pair of driving wheels; a prime mover; a transmission mechanism for transmitting power from said prime mover to said driving wheels; a pedal in said mechanism having connecting and disconnecting stations; a fluid controlled braking mechanism associated with said driving wheels; a fluid valve for manually controlling said fluid controlled brake mechanism; and means including gears on the driving wheels and segments adjacent thereto, the latter having link connections with the fluid valve and being adapted to drop into the gears on the driving wheels and to automatically operate the fluid valve and thereby the fluid controlled braking mechanism when said pedal is in the disconnecting position upon rearward rotation of the wheels.

12. In a motor vehicle, the combination of a main frame, wheels on said main frame; a transmission; brakes on the wheels; an operating system associated with said brakes; a brake; a take-up plate in said brake operating system; a clutch pedal in said transmission mechanism associated with said take-up plate; and connecting means associated with said driving wheels adapted to control said take-up plate so that the plate moves the associated brake operating system which in turn automatically moves the interconnected brake into operative wheel holding position upon rearward rotation of the wheels when the clutch pedal is in a predetermined position.

13. In a motor vehicle, the combination of wheels; a braking mechanism; a transmission mechanism; a controlling mechanism connecting said braking mechanism and said transmission mechanism; a clutch pedal in said transmission mechanism; and means associated with the wheels on the car and with the controlling mechanism adapted to operate the braking mechanism automatically upon rearward rotation of the wheels when the clutch pedal is in predetermined position.

14. In a motor vehicle, the combination of a chassis; driving wheels on said chassis; wheel driving mechanism; brakes on said driving wheels; manually operable mechanism for controlling said brakes; a take-up plate associated with said last named mechanism and with the wheel driving mechanism; a connector directly associated with at least one of said driving wheels; and one link extending from said connector to the take-up plate adapted to operate the brakes automatically upon rearward movement of the wheels when the wheel driving mechanism is in predetermined position.

15. In a motor vehicle, the combination of wheels; a manually operable braking mechanism; a transmission mechanism; connectors associated directly with the wheels; a transmission control pedal; and means connecting said braking mechanism, transmission mechanism and connectors, adapted to automatically operate the braking mechanism upon rearward movement of the wheels when the transmission control pedal is in predetermined condition.

16. In a motor vehicle, the combination of a chassis; wheels on said chassis; a transmission mechanism; brakes on said wheels; manually operable mechanism for controlling said brakes; a take-up plate associated with said last named mechanism and with the transmission mechanism; a connector associated with at least one of said wheels; and one link extending from said connector to the take-up plate adapted to operate the brakes automatically upon rearward movement of the wheels when the transmission mechanism is in predetermined position.

17. In a motor vehicle, the combination of wheels; brakes for said wheels; manually operable mechanism for controlling said brakes; a prime mover; a driving mechanism for the vehicle, having operative and inoperative positions; and gravity means associated with said wheels and said driving mechanism adapted to automatically operate said manually operable braking mechanism and thereby cause said brakes to frictionally hold the wheels against turning whenever said driving mechanism is in the inoperative position and the car begins to roll backward.

18. In a motor vehicle, the combination of wheels; a manually operable braking mechanism; a transmission mechanism; connectors directly associated with the wheels; a transmission control device; and means connecting said braking mechanism, transmission mechanism and connectors, adapted to automatically operate the braking mechanism upon rearward movement of the wheels when the transmission control device is in predetermined condition.

AUBREY H. LLOYD.